United States Patent
Aggarwal et al.

(10) Patent No.: US 10,205,691 B2
(45) Date of Patent: *Feb. 12, 2019

(54) PRESENCE INFORMATION BASED MESSAGING (71) Applicant: AT&T Intellectual Property I, L.P., Atlanta, GA (US)

(72) Inventors: Vaneet Aggarwal, Parsippany, NJ (US); Rittwik Jana, Montville, NJ (US); Gerald Michael Karam, Morristown, NJ (US); John F. Murray, Denville, NJ (US); Christopher W. Rice, Parsippany, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 19 days.

This patent is subject to a terminal disclaimer.

(21) Appl. No.: 15/464,256

(22) Filed: Mar. 20, 2017

(65) Prior Publication Data
US 2017/0195264 A1    Jul. 6, 2017

Related U.S. Application Data (63) Continuation of application No. 13/523,602, filed on Jun. 14, 2012, now Pat. No. 9,602,448.

(51) Int. Cl.
G06F 15/16       (2006.01)
H04L 12/58       (2006.01)
H04W 4/021       (2018.01)

(52) U.S. Cl.
CPC .......... H04L 51/043 (2013.01); H04L 51/046 (2013.01); H04L 51/20 (2013.01); H04W 4/021 (2013.01)

(58) Field of Classification Search
CPC ...... H04L 51/043; H04L 51/046; H04L 51/20
USPC ..................................................... 709/206
See application file for complete search history.

(56) References Cited

U.S. PATENT DOCUMENTS

| | | | |
|---|---|---|---|
| 9,602,448 B2* | 3/2017 | Aggarwal | H04L 51/043 |
| 2007/0043828 A1* | 2/2007 | Famolari | H04L 51/043 |
| | | | 709/219 |
| 2007/0232274 A1 | 10/2007 | Jung et al. | |
| 2009/0150489 A1 | 6/2009 | Davis | |
| 2009/0309787 A1 | 12/2009 | Gildea | |
| 2013/0298044 A1 | 11/2013 | Bill | |

* cited by examiner

*Primary Examiner* — Alan S Chou (57) ABSTRACT

Methods and devices for providing presence based messaging are disclosed. For example, a method receives a message including a message content, an identifier of a recipient and a presence parameter. The presence parameter may comprise a speed parameter pertaining to a speed of a device associated with the recipient or a mood parameter pertaining to a mood of the recipient. The method then stores the message and delivers the message to the device associated with the recipient when the presence parameter is satisfied.

20 Claims, 5 Drawing Sheets

PRESENCE INFORMATION BASED MESSAGING

This application is a continuation of U.S. patent application Ser. No. 13/523,602, filed Jun. 14, 2012, now U.S. Pat. No. 9,602,448, which is herein incorporated by reference in its entirety.

The present disclosure relates generally to communication networks and, more particularly, for providing messaging based upon presence information.

BACKGROUND

Communication network based messaging takes several forms including real-time direct voice or text-based communication between two or more people using personal computers, telephones, cell phones, smart phones or other mobile devices or asynchronous communications involving text, images, voice or other media. The users' text or other media is conveyed over one or more networks, such as the Internet (e.g., using a Voice over Internet Protocol (VoIP)), an intranet, a cellular network, an IEEE 802.11 network and numerous other types of networks. Some common examples of messaging are instant messaging with clients, short message service (SMS) messages, e-mails, picture messaging, voice messaging, etc. In the case of SMS messages or e-mails, a sender may send a message without regard to the ability of a recipient to receive the message. The message may be delivered immediately or may be stored on a device in a network, e.g., a message server, until such time and the recipient becomes available or actively retrieves the message from the server.

SUMMARY

In one embodiment, the present disclosure discloses a method for providing presence based messaging. For example, the method receives a message including a message content, an identifier of a recipient and a presence parameter, where the presence parameter comprises a speed parameter pertaining to a speed of a device associated with the recipient. The method then stores the message and delivers the message to the device associated with the recipient when a speed of the device associated with the recipient is determined to satisfy the speed parameter.

In another embodiment, the present disclosure discloses an additional method for providing presence based messaging. For example, the method receives a message includes a message content, an identifier of a recipient and a presence parameter, where the presence parameter comprises a mood parameter pertaining to a mood of the recipient. The method then stores the message and delivers the message to a device associated with the recipient when the mood of the recipient is determined to satisfy the mood parameter.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses methods, apparatus and non-transitory computer-readable media for providing presence based messaging. Although the present disclosure may describe embodiments in the context of particular networks, systems and environments, the present disclosure is not so limited. Namely, the present disclosure can be applied to any type of computer-based communication network that is capable of supporting communications between devices. For instance, embodiments of the present disclosure may be deployed in, or provided by, a core network application server and the like.

In various embodiments, the present disclosure provides a network-based messaging service that enables users to send messages with particular conditions/triggers based upon presence information of the intended recipient(s) and/or upon the presence information of the sender. For instance, a sender may wish to communicate with one or more recipients, but only if certain presence attributes of the one or more recipients are satisfied. As an example, a wife may want to schedule a message to be delivered to remind her husband to go to school to pick up their child. However, if her husband is already at the school at the appropriate time, she may not wish the message to be delivered. To facilitate such presence based messaging, one or more exemplary presence parameters are specified in or along with a message such as: a time parameter, a location parameter, a relationship parameter, a device identifier parameter, an accept group of messages parameter, an availability parameter, a speed parameter and a mood parameter, as well as personal information such as biographical information, job profile, friends and family information, network account information and social network information.

For example, a time parameter defines a time window in which a delivery of the message should be attempted. For example, the time parameter may define a time window of between 9:00 am to 5:00 pm, 7:15 pm-7:30 pm, and so on.

A location parameter may be defined with respect to a particular street address, landmark, coordinate set, Global Positioning System (GPS) coordinates and the like. For instance, a geofence may be defined by a particular location and a specified distance or radius surrounding the location, e.g., within one mile of a location, within 100 yards of a location and so on. The location of an intended recipient may then be determined based upon cell tower location, which may include triangulation techniques, global positioning satellite information, wireless access point location, among others. In one example, a location parameter may indicate that a message should be sent to a recipient if the recipient is within (or not within) a particular geofence. In another embodiment, a location parameter may indicate that a message should be sent if the sender is at or near a particular location. For instance, a sender may wish to let a friend know that he or she will be arriving shortly. Thus, the location parameter may specify that the message be sent when the sender is within a geofence with a two mile radius around the friend's house or when the sender passes a particular point on a road, etc.

An availability parameter relates to an availability state of an intended recipient. An availability state of a recipient may be determined from calendar information, instant messaging service status, social network status, etc. For example, the availability state can be "free", "busy", "accepting messages", and/or "not accepting messages." The busy state may further include an "in a meeting" state, "on a call" state, "on a break" state, "currently traveling" state or other states as defined by a user or a service provider. The accepting messages state may further optionally include the condition for accepting the messages, e.g., the type of message, the length of message, the identity of the sender, and so on. Accordingly, an availability parameter of a message may specify that the message should be delivered only when the availability state or the recipient is "free", "accepting messages" and the like.

A proximity parameter is similar to a location parameter, but further involves the location of multiple people or landmarks with respect each other and to which the delivery of a message can be tied (for instance, the addresses or the points of interest or certain shops, malls, etc.). As an example, a proximity parameter may specify that a message should be sent from user A to users B and C, but only if users B and C are within a specified distance (or proximate) of one another.

A speed parameter may relate to a threshold speed of a recipient's device above or below which a message may or may not be sent. This attribute can be observed by, for instance, by an accelerometer on a phone, a peripheral device attached to the phone through wired or wireless connection (e.g., Bluetooth), or derived from GPS location information, cell base station data or wireless access point data to detect changes in position, etc. For instance, a parent may wish to send a message to a teenage child, but does not want the message to be delivered to the child's mobile phone if the child may be driving a car. The parent may therefore set a speed parameter of five feet per second, for example. If the speed of the mobile phone satisfies the speed parameter (i.e., is below five feet per second), the message is delivered. Otherwise, the message is stored and not delivered until it is detected that the speed is below the threshold, or until it is detected that the speed is below the threshold for a particular duration of time, e.g., within a 10 minute window. This may avoid the message being delivered if a car in which the child/device is travelling temporarily stops at a traffic light or is stuck in traffic.

A relationship parameter may relate to a relationship status between a sender and one or more intended recipients. The relationship status may comprise "family", "friend", "acquaintance", "co-worker", "spouse", "child", "parent", "sibling", "clients", "customers", "supervisor", "employee" and so on. In addition, the relationship status may be derived from one or more of the sender or recipients' address books, designated social network "friends", instant messaging, and the like.

A device identifier parameter may relate to particular device types (e.g., computer, laptop, mobile phone, tablet, pager, personal assistance device, and so on) of one or more intended recipients of a message. For example, a sender may wish to send a message to a recipient, but does not want the message delivered to the recipient's cellular phone. Rather, the sender would like the message to be delivered only when the recipient is present on his or her personal computer or other device besides the cellular phone. As such, the sender may set a device identifier parameter to "personal computer only" or "exclude cellular telephones." The device type(s) of the device(s) where a recipient can be reached may be known or determined by the network based upon the registrations and de-registrations of the device(s), and ongoing status information of such device(s) in communication with the network.

A mood parameter may relate to a mood of an intended recipient (e.g., positive moods such as, happy, excited, relaxed, content, calm, cheerful, optimistic, pleased, blissful, amused, refreshed, or satisfied; negative moods such as sad, angry, upset, devastated, mad, hurt, sulking, depressed, annoyed or enraged; neutral moods such as indifferent, bored and so on). Mood information can be collected from various points of data, such as by receiving a user entry made by the recipient on the device associated with the recipient, by deriving from calling/messaging patterns, biometric sensors (e.g., acoustic sensors, temperature sensors and the like), processing of images of the recipients as captured by a camera or video recorder, explicit mood entries in a social networking host or website, e.g., via a profile or instant messaging profile where the recipient actively declares his or her current mood), and so on.

An accept group of messages parameter may relate to a status set by an intended recipient as to who he or she will accept messages from, which message priorities or categories he or she will accept, and the like. For example, a sender may set an accept group of messages parameter in a message so that the message is only delivered to recipients who are accepting non-urgent messages. A recipient who is only accepting urgent or work-related messages or who is only accepting messages from immediate family members or work contacts will not have the message delivered. However, if the recipients accept group of messages status changes, the message may then be delivered at such later time.

It should be noted that the foregoing presence parameters are mentioned by way of example only, and that other, further and different presence parameters may be implemented in accordance with the present disclosure as will be appreciated by those skilled in the art. In addition, although the above presence parameters are described individually, various embodiments of the present disclosure provide for presence based messaging where a message may designate two or more different presence parameters. In other words, the message may be delivered, or not, depending upon whether at least one, both or all of the presence parameters of the message are satisfied. For example, a wife may want to schedule a message to be delivered to remind her husband to go to school to pick up their child. However, if her husband is already at the school at the appropriate time, she may not wish the message to be delivered. Thus, the wife may send a message with at least two presence parameters (location and time) such that if the recipient device (e.g., the husband's mobile telephone) is within a particular geofence (e.g., within one mile from the school) within a particular event timeframe (e.g., within 5 minutes of the specified pick-up time) the message will not be sent. In this regard, it should also be noted that in one embodiment, a sender may specify a time-to-live value or other expiration indicator. For example, if the presence parameters are not satisfied within six hours, then discard the message. In another example, if the timeframe in the time parameter expires, then discard the message. Alternatively, or in addition, a network operator may set a default expiration timer value that will discard stale messages that have not been delivered within a specified time.

As mentioned above, a user may desire to send a message to a recipient, but would like to wait until certain criteria based on the presence information/attributes of the recipient are met before sending the message. Thus, delivery may be delayed until the certain attributes are satisfied or until the message is discarded. Accordingly, in one embodiment a recipient's presence information or attributes are continuously (e.g., periodically) checked to determine whether one or more presence parameters of a message are satisfied. The frequency with which such presence information is checked may be a configurable parameter set by a network operator.

In some cases, potential message recipients may prefer not to share certain presence information. Accordingly, one embodiment enables users to completely or partially opt out of presence based messaging services through one or more user preferences. For example, a network provider may enable a user to configure a list of trusted senders with whom all presence information, or selected presence information may be shared. Alternatively, or in addition, the user may specific certain senders or blocks of senders (e.g., by sender type, network location, etc. with whom the user does not wish to share any presence information. In addition, a user may also desire to restrict receiving messages with conditions on certain attributes (i.e., presence parameters pertaining to certain presence information) to only those messages sent by senders who can be accounted for. For instance, a user may not want others to know whether he or she went to a certain location, which may be known based on the success or failure of the delivery of the message. However, if a sender is on a designated list of trusted senders, the receiving user may still enable the message to be delivered. On the other hand, if the sender is not on a list of trusted senders, the message may be delivered and a delivery report can be returned to the sender stating that the presence information of the recipient is unavailable and thus the message could not be delivered.

In one embodiment, user preferences such as described above are maintained in a user profile. In one embodiment, the messaging service obtains a user profile and/or other user information externally. For example, an application server may obtain the user profile from a home subscriber server (HSS)/home location register (HLR).

Embodiments of the present disclosure thus address the problem of users wishing to send messages, but only if certain conditions (i.e., presence parameters) are fulfilled. Thus, embodiments of the present disclosure save a sender from the embarrassment, frustration or risk of sending a message at an inopportune time for a recipient. At the same time, embodiments of the present disclosure enable recipients to control whether and with whom their presence information may be shared to facilitate the sending of presence based messages.

Figure 1:
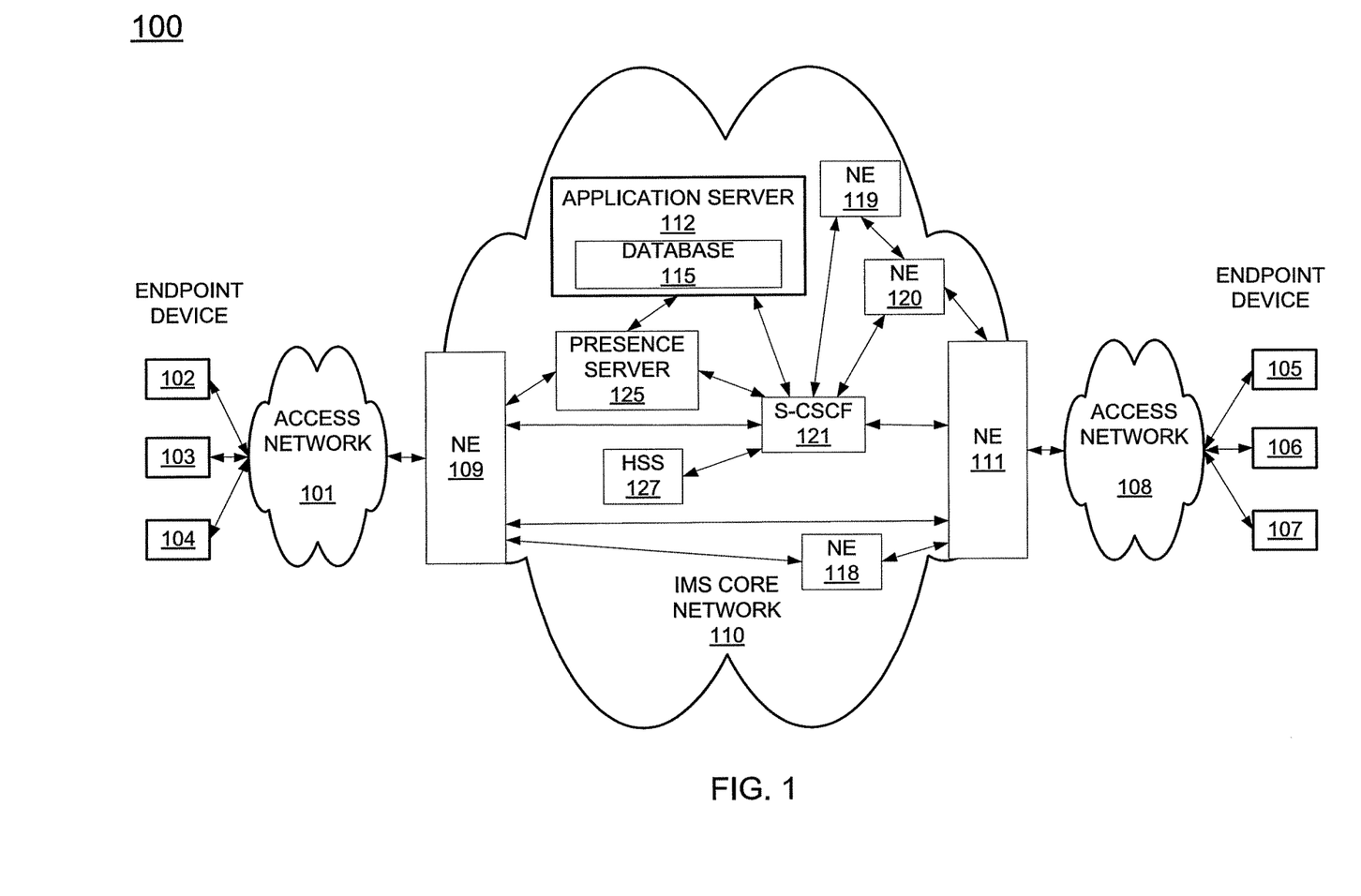
FIG. 1 illustrates an exemplary network related to the present disclosure.

To better understand the present disclosure, FIG. 1 illustrates an example network 100, e.g., an Internet Protocol (IP) Multimedia Subsystem network related to the present disclosure. An IP network is broadly defined as a network that uses Internet Protocol to exchange data packets. Exemplary IP Multimedia Subsystem (IMS) networks include Internet Protocol (IP) networks such as Voice over Internet Protocol (VoIP) networks, Service over Internet Protocol (SoIP) networks, and the like.

In one embodiment, the network 100 may comprise a plurality of endpoint devices 102-104 configured for communication with the core IMS network 110 (e.g., an IP based core backbone network supported by a service provider) via an access network 101. Similarly, a plurality of endpoint devices 105-107 are configured for communication with the IMS core packet network 110 via an access network 108. The network elements 109 and 111 may serve as gateway servers or edge routers for the network 110.

The endpoint devices 102-107 may comprise customer endpoint devices such as personal computers, laptop computers, personal digital assistants (PDAs), mobile/cellular phones, smart phones, tablets, private branch exchanges (PBXs), aggregate endpoints (e.g., an aggregate endpoint that employs a session initiation protocol (SIP) user agent to interact with the network on behalf of a plurality of endpoints aggregated behind it) and the like. The access networks 101 and 108 serve as a means to establish a connection between the endpoint devices 102-107 and the network elements (NEs) 109 and 111 of the IMS core network 110. The access networks 101 and 108 may each comprise a digital subscriber line (DSL) network, a broadband cable access network, a local area network (LAN), a cellular network, a wireless access network, a third party access network, a Wi-Fi network, and the like. In one particular embodiment, at least one of the access networks 101 and 108 comprises a cellular/wireless access network. The access networks 101 and 108 may be either directly connected to NEs 109 and 111 of the IMS core network 110, or indirectly through another network.

Some NEs (e.g., NEs 109 and 111) reside at the edge of the IMS core infrastructure and interface with customer endpoints over various types of access networks. An NE that resides at the edge of a core infrastructure is typically implemented as an edge router, a media gateway, a proxy server, a border element, a firewall, a switch, and the like. An NE may also reside within the network (e.g., NEs 118-120) and may be used as a SIP server, an application server, a core router, or like device.

The IMS core network 110 also comprises a home subscriber server (HSS) 127, a serving—call session control function (S-CSCF) 121, a media server (MS) 125, and an application server 112 that contains a database 115. For a specific session, the S-CSCF of the calling party and the S-CSCF of the called party are also referred to as the originating S-CSCF and the terminating S-CSCF, respectively. An HSS 127 refers to a network element residing in the control plane of the IMS network that acts as a central repository of all customer specific authorizations, service profiles, preferences, etc.

The S-CSCF 121 resides within the IMS core infrastructure and is connected to various network elements (e.g., NEs 109 and 111) using the session initiation protocol (SIP) over the underlying IMS based core backbone network 110. The S-CSCF 121 may be implemented to register users and to provide various services (e.g., VoIP services, cellular services and the like). The S-CSCF interacts with the appropriate VoIP/SoIP service related applications servers (e.g., 112), when necessary. The S-CSCF 121 performs routing and maintains session timers. The S-CSCF may also interrogate an HSS to retrieve authorization, service information, user profiles, etc. In order to complete a call that requires certain service specific features, the S-CSCF may need to interact with various application servers (e.g., various VoIP servers, in the case of a VoIP/voice call, other devices in the case of calls/messages terminating and/or originating in cellular access networks). For example, the S-CSCF may need to interact with another server for translation of an E.164 voice network address into a SIP uniform resource identifier (URI), and so on. For example, the S-CSCF routes to a proxy—call session control function (P-CSCF) indicated by the SIP URI. The P-CSCF (not shown) then routes to the SIP user agent (UA) over a relationship that is established between the P-CSCF and the SIP UA which may represent an aggregate endpoint. This relationship could be a SIP trunk. It should be noted that FIG. 1 only provides a very simplified view of an illustrative IMS network and is not intended to be a comprehensive view of the IMS network.

In one embodiment, the presence server 125 is a dedicated server that tracks user presence data and user preferences. For example, the presence server 125 is capable of tracking a large number of presence parameters associated with a user or a particular user account, such as the various presence parameters as discussed above. In one embodiment, various presence parameters are processed and stored by the presence server 125 for use by application server 112 in making routing/delivery decisions for presence based messages.

In one embodiment, the network elements that are involved in supporting calls, messages and registrations of the network elements will provide presence information to the presence server 125. For example, a user may own endpoint device 102, which may comprise a cellular telephone, and may also own endpoint device 105, which may comprise a laptop computer. As such, access network 101 may comprise a cellular network and access network 108 may comprise a cable provider network providing Internet access to the user's home. Consider where the S-CSCF 121 may register endpoint device 102 with the core IMS network 110. Since the endpoint device 102 (i.e., the cellular telephone) is currently registered with the S-CSCF 121, the S-CSCF 121 therefore knows that the user is currently present on his cellular phone (endpoint device 102) and is accessible via access network 101. Accordingly, this presence information may be passed by the S-CSCF 121 to presence server 125. In the same manner, any and all network elements, including devices/network elements in the access networks, may generate presence information of a user and/or device in association with a particular call, message or registration. For example, a base station in a cellular access network (e.g., access network 101) may indicate that endpoint devices 102, 103, and 104 are currently serviced by the base station. As such, presence information indicating that the endpoint devices are serviced by this particular base station may be passed to the presence server 125. This particular type of presence information indicates both an approximate geographic location of a user as well as the user's presence on the cellular network via the user's cellular endpoint device (as opposed to the user being present on a home or work computer, a wireless access network, VoIP phone, etc.). In the context of the present disclosure, the presence server 125 may collect such presence information from any and all such network elements, or selected network elements deployed in network 100. In one embodiment, the presence server 125 polls network devices to obtain user presence information. In another embodiment, various network elements automatically send presence information to the presence server 125 (e.g., according to a predefined schedule, at the end of each call/message/session, etc.).

The application server (AS) 112 may comprise any server or computer that is well known in the art, and the database 115 may be any type of electronic collection of data that is also well known in the art. In one embodiment, application server 112 supports a short message service center (SMSC) for performing various functions described herein for providing presence based messaging. In particular, the application server 112 may provide various SMSC functions (described in greater detail below in connection with FIG. 2 and SMSC 265) in addition to the functions of the present disclosure described herein.

In one embodiment, the application server 112 stores presence based messages (e.g., in database 115), makes decisions regarding whether conditions are satisfied for the delivery of such messages and sends or discards such messages accordingly. In one embodiment, a message may include a message content, an intended recipient identifier and one or more presence parameters as specified by the sender. For example, an application on the sender's endpoint device may cause a presence based SMS message to be addressed to application server 112. However, the actual intended recipient may be identified by a telephone number, an email address, a SIP address, and the like. Accordingly, network elements will first route the message to the application server 112 for processing in accordance with the present disclosure, rather than sending the message directly to the intended recipient (e.g., endpoint device 105).

Upon receiving the presence based SMS message, the application server 112 may then perform various functions which may result in the message being sent to the intended recipient, stored until various conditions are satisfied or discarded. In particular, in one embodiment the application server 112 obtains presence information from the presence server 125 and compares the received presence information to the one or more presence parameters in the message delivery request. If the one or more presence parameters are satisfied, the application server 112 forwards the message to the recipient. In one embodiment, application server 112 additionally obtains the recipients' user preferences from presence server 125 and/or for home subscriber server (HSS) 127 or a home location register (HLR).

The above IP network is only described to provide an illustrative environment in which packets for voice, data and/or multimedia services are transmitted on networks. Thus, those skilled in the art will realize that the communication system 100 may be expanded by including additional endpoint devices, access networks, network elements, application servers, etc. without altering the scope of the present disclosure.

Figure 2:
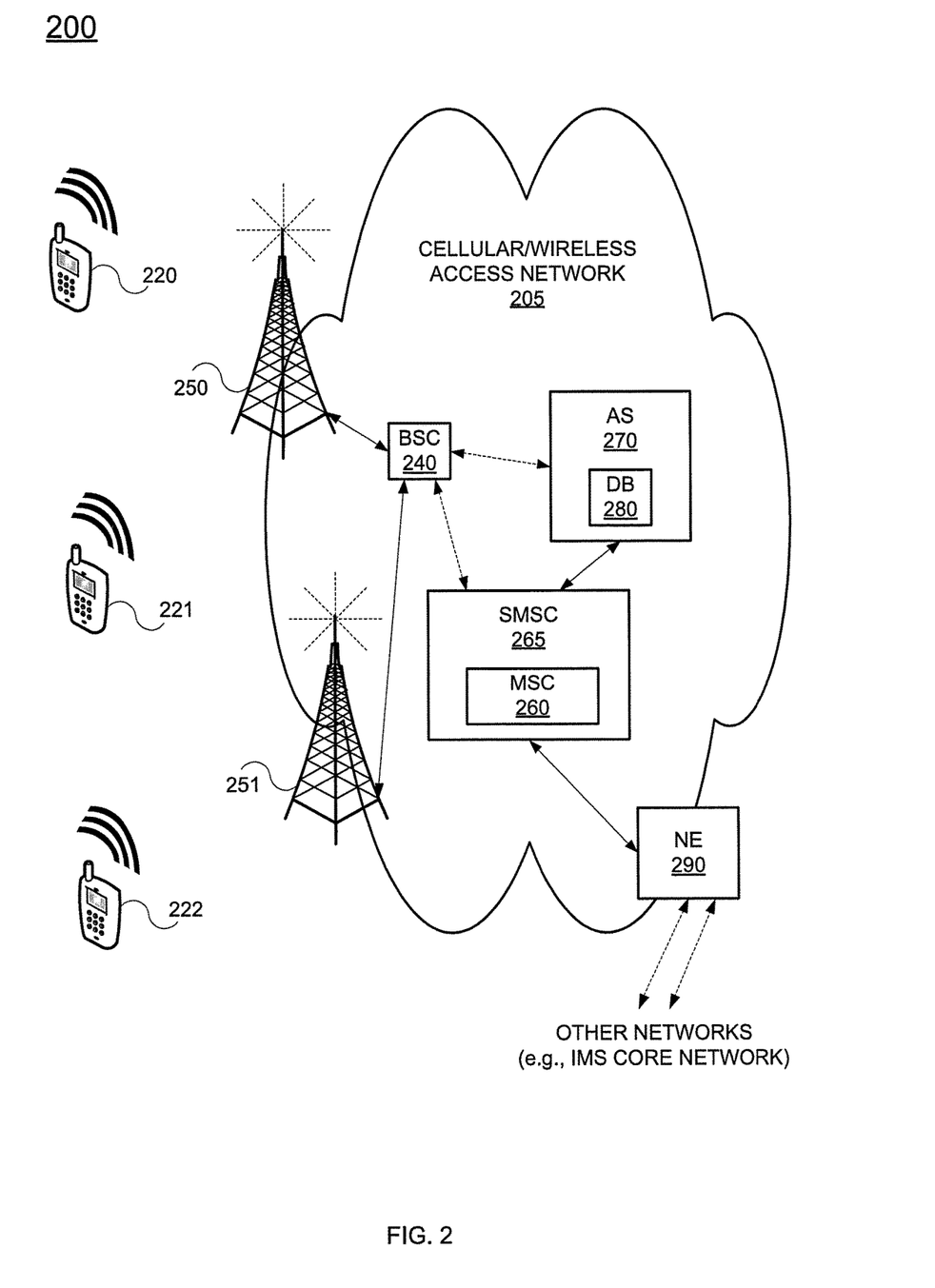
FIG. 2 illustrates an exemplary wireless access network related to the present disclosure.

FIG. 2 illustrates an exemplary access network 200 suitable for implementing embodiments of the present disclosure for providing presence based messaging. In one embodiment, the access network 200 comprises a wireless access network 205 (e.g., a cellular access network or an Long Term Evolution (LTE) network). Access networks 101 and 108 depicted in FIG. 1 may comprise, for example, a wireless access network 205 as shown in FIG. 2. Wireless access network 205 is configured to support wireless communication of users via respective wireless endpoint devices 220-222, with other wireless or wireline users. The links between wireless endpoint devices 220-222 and the wireless access network 205 comprises radio frequency (RF) signals between the one or more base stations 250-251 and the wireless endpoint devices 220-222. Here only two base stations 250 and 251 are depicted. However, it should be appreciated that the wireless access network 205 may comprise any number of base stations depending upon the size and needs of the wireless access network. In addition, although only three wireless endpoint devices 220-222 are depicted, it should be appreciated that any number of wireless endpoint devices may be serviced at the same time by the wireless access network 205.

Each of the base stations 250-251 comprises, at a minimum, a RF transceiver, and is configured to receive and transmit RF signals to and from wireless endpoint devices (e.g., wireless endpoint devices 220-222). As illustrated in FIG. 2, base stations 250-251 may support calls for a plurality of wireless endpoint devices 220-222 in a particular cell or cell sector of the base station. To manage the communications of the multiple wireless endpoint devices serviced by the wireless access network 205, the wireless access network 205 may comprise one or more network elements. For example, the wireless access network 205 may comprise one or more base station controllers (BSCs) and/or Radio Network Controllers (RNCs) 240 for managing RF communication of the base stations 250-251. Although only one BSC/RNC 240 is depicted in FIG. 2 it should be understood that any number of BCSs/RNCs can be deployed. For example, each base station 250-251 could be serviced by its own BSC/RNC, or multiple base stations can be served by a single BSC/RNC. BSC/RNC 240 performs a variety of wireless network management related tasks such as wireless channel assignments, determining transmission power levels, and controlling handovers from one base station to another base station, and the like. It should be noted that some of the functionalities of BSC/RNC could be implemented in the base stations 250-251. Similarly, some of the functionalities of BSC/RNC could be implemented in the mobile switching center (MSC) 260.

In one embodiment, wireless access network 205 includes at least one mobile switching center (MSC) 260. Among other functions, the MSC 260 may maintain user profile records for users currently serviced by the base stations within the portion of the wireless access network that is the responsibility of the MSC 260. For example, the MSC provides the information that is needed to support mobile service subscribers, such as user registration and authentication information. The MSC may also function as a media gateway and/or media gateway controller facilitating communication between the wireless access network 205 and other networks. For example, in a typical circuit-switched wireless communication system, the MSC may connect the landline circuit switched network (e.g., a public switched telephone network (PSTN) system), or an IMS network, to the wireless communication system. Thus, the MSC 260 may be responsible for connecting calls from wireless endpoint devices 220-222 to other wireless endpoint devices on the same access network or on other networks such as a session initiation protocol (SIP) based internet protocol multimedia subsystem (IMS) core network, a landline circuit switched network (e.g., a public switched telephone network (PSTN)), VoIP networks, asynchronous transfer mode (ATM) or frame relay networks, etc., via a network element 290.

In one embodiment, the wireless access network 205 includes a short message service center (SMSC) 265. The SMSC is responsible for receiving SMS messages from and for forwarding SMS messages to the wireless/mobile endpoint devices 220-222. The SMSC 265 transmits SMS messages to other networks, when a SMS message originates from one of the wireless endpoint devices 220-222, and forwards SMS messages to the wireless endpoint device 220-222, when a SMS message is sent from elsewhere to one of the wireless endpoint devices 220-222. If one of the wireless endpoint devices 220-222 is unavailable to receive a message, the SMSC 265 will store the SMS message until the particular wireless endpoint device becomes available. Although the MSC 260 may perform numerous functions that are unrelated to SMS messages, in one embodiment the MSC 260 is a component of the SMSC 265. Thus, as illustrated in FIG. 2, MSC 260 forms part of the SMS 265.

However, it should be understood that the present disclosure is not so limited. Namely, in other embodiments, the MSC 260 and SMSC 265 may be separate components. In addition, the SMSC 265 may provide various reports to the sender and/or recipient with respect to the submission, status and delivery of a SMS message. In this regard, it should be noted that aspects of such reports may be reflected in features in one or more call detail records (CDRs) generated by the SMSC 265, and other components, in connection with a particular message or call. In one embodiment, the SMSC 265 is configured to forward SMS messages in a manner that is compatible with other networks. For example, the SMSC 265 may be a session initiation protocol (SIP) capable device and may therefore encapsulate a SMS message in a SIP protocol message in order to convey the SMS message through an IP network (e.g., an IMS core network) for onward transmission to a recipient device. For instance, the SMSC 265 may forward a SIP encapsulated SMS message externally from the cellular/wireless access network 205 via network element 290 (e.g., to a S-CSCF, application server or other device in a core IMS network).

In one embodiment, the wireless access network 205 may also include an application server 270. The application server 270 may include a database 280 suitable for collecting and storing call detail records (CDRs) (e.g., with respect to CDRs generated by network elements of the wireless access network 205, such as SMSC 265) as well as various presence parameters with respect to one or more of the endpoint devices 220-222 and/or the users of such devices. For example, application server 270 may collect and record speed and/or location information with respect to one or more of the endpoint devices 220-222. In one embodiment, the application server 270 may also forward collected and stored presence information outside the wireless access network 205. In particular, the application server 270 may send the collected presence information to a presence server in an IMS core network (e.g., presence server 125 in FIG. 1) for further processing according to the present disclosure. The application server 270 may be configured to provide one or more functions supporting calls via the wireless access network 205. For example, application server 270 may comprise any server or computer that is well known in the art, and the database 280 may be any type of electronic collection of data that is also well known in the art. In other embodiments, complementary or additional presence information of various endpoint devices and/or the users of such devices may be stored in base station 250, BSC/RNC 240 or MSC 260, or a combination thereof.

Although the network elements deployed within the wireless access network 205 have been described as one or more discrete devices, it should be appreciated that the functionality described with respect to each network element is not limited to the particular device as described and depicted herein. Rather, the embodiment of FIG. 2 is merely illustrative of one wireless access network configuration that is suitable for implementing embodiments of the present disclosure. Thus, any other network elements providing the same functionality described herein with respect to the wireless access network 205 would be equally suitable for use in accordance with embodiments of the present disclosure. It should be noted that the wireless access network 205 may be expanded by including additional endpoint devices, base stations, BSCs, MSCs, service general packet radio service (GPRS) support nodes (SGSNs), gateway GPRS support nodes (GGSNs), network elements, application servers, etc. without altering the scope of the present disclosure. In addition, it should be noted that although certain components have been depicted and described in connection with wireless access network 205, in some embodiments, such components may be interconnected in a different manner or may even reside in different networks. For example, SMSC 265 may be located in an IMS core network (e.g., IP core network 110 in FIG. 1) rather than in an access network, or may even be hosted by a third-party (e.g., not in the wireless access network 205 and not in a core communication network). In one specific example, application server 112 of FIG. 1 may comprise a SMSC for executing various functions of the present disclosure.

Figure 3:
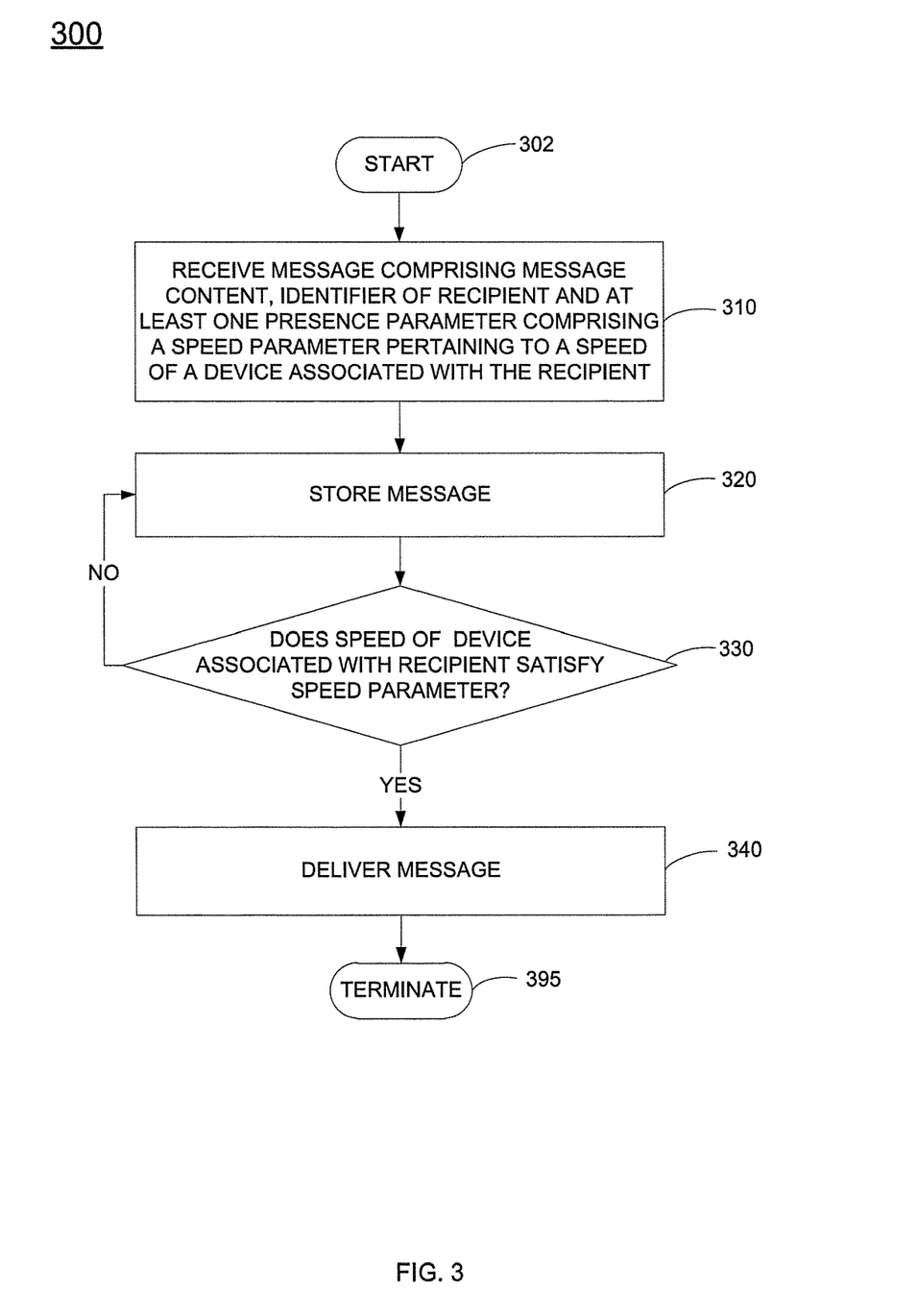
FIG. 3 illustrates a flowchart of a method for providing presence based messaging according to the present disclosure.

FIG. 3 illustrates a flowchart of a method 300 for providing presence based messaging. In one embodiment, one or more steps (or operations) of the method 300 can be performed by one or more of the components of the core network 110 and/or access networks 101, 108 or 200. For example, in one embodiment one or more steps of the method 300 can be implemented by an application server such as AS 112 or SMSC 265. Alternatively, or in addition, one or more steps of the method 300 may be implemented by a general purpose computer having a hardware processor, a memory and input/output devices as illustrated below in FIG. 5.

The method begins in step 302 and proceeds to step 310. At step 310, the method 300 receives a message (e.g., from a sender device). In one embodiment, the message includes message content, an identifier of one or more recipients and at least one presence parameter comprising at least a speed parameter. The speed parameter relates to a speed of a recipient's device. The speed parameter may be selected by the sender to define a speed threshold for the delivery of the message. For instance, the sender may be a parent who wants to send a message to a teenage child, but does not want the message to be delivered to the child's cellular phone if the child is driving a car, riding a bicycle, and the like. The parent may therefore set a speed parameter of five feet per second, for example. If the speed of the cellular phone satisfies the speed parameter (i.e., is below five feet per second), the message is to be delivered. Otherwise, the message is to be stored and not delivered until it is detected that the speed is below the threshold, or until it is detected that the speed is below the threshold for a particular duration of time (which may also be specified by the sender). This may avoid the message being delivered if a car in which the child/device is travelling temporarily stops at a traffic light.

In this regard, it should be noted that in some embodiments one or more additional presence parameters may be included in the message. For example, as already mentioned above, the sender may specify that a speed (i.e., the speed parameter) need to remain below a particular value for a particular duration of time (i.e., a time parameter). In another embodiment, the sender may specify a mood parameter such that the message is only sent if the device of the recipient is below the speed threshold (e.g., the recipient is likely not driving a car) and the mood of the recipient is not a negative mood. For example, the sender may be asking the recipient for help with a chore but does not want to distract the recipient while he/she is driving and does not want to ask for help while the recipient is in a negative mood. In still another embodiment, the sender may wish to notify a friend that he/she will be arriving shortly, but does not want to send the message if the friend is also driving in a car. Therefore, the sender may send a message with a speed parameter pertaining to the speed of the recipient's device (the friend's device) as well as a location parameter pertaining to the location of the sender's device (e.g., within two miles of the friend's home). As such, the message may be sent to the friend when the sender is within two miles of the friend's home, but only if the friend's device is determined to be below a speed threshold set by the speed parameter. It should be appreciated that various other combinations of presence parameters are possible in the same nature as the examples given here.

The message content may comprise any form of user or application data that the sender wishes to send to the recipient(s). For example, the message content may comprise a SMS message, a voice message, a video message, a picture, an email, and the like, or may include multiples and combinations of each of these media types. A recipient identifier may comprise any one or more identifiers associated with a recipient, an account of the recipient, or one or more devices associated with the recipient or the account. For example, a recipient identifier may comprise a telephone number, an extension number, an email address, a SIP URI, a screen name, a handle, an account number, a user name, an Internet Protocol address, an international mobile subscriber identity, and so on. In one embodiment, a network based device or an endpoint device of the sender stores recipient identifiers as defined by the sender. For example, the sender may have an address book that associates recipients' names, nicknames or quick dial assignments with other recipient identifiers (e.g., a telephone number). As such, the sender may send a presence based message using a recipient's name as an identifier, but the method 300 may route and deliver the message using a related identifier (e.g., a telephone number).

Similarly, groups of recipients may be identified by a group identifier, such as a subnet identifier, or a group name, which may be defined by a sender or an organization, such as the sender's and/or the recipients' employer. In this regard, it should also be noted that in many instances, the sender will not know a particular device where the recipient is present and may be reached. For instance, the sender may send a message identifying a recipient by an email address. However, because the sender may not know where the recipient is or what the recipient is doing, the sender does not know whether the message will be delivered to the recipient on a work computer, a cellular phone, a home computer, etc. For instance, a recipient may subscribe to a follow-me service which allows the recipient to customize how a network provider will route calls and messages to the recipient at one or more devices/locations. Thus, in addition to determining if sender-defined presence parameters in the message are satisfied, the method 300 may additionally determine where and on which device(s) a recipient is present in order to determine how to deliver the message.

At step 320, the method 300 stores the received message. For example, at the following step 330 the method 300 will need to make a determination as to whether the presence parameters are satisfied prior to delivering the message to the intended recipient(s). Thus, in the meantime, at step 320, the method 300 stores the message.

At step 330, the method 300 determines whether the speed of a device associated with the recipient satisfies the speed parameter. As described above, the method 300 may receive a message having a message content and a speed parameter. The speed parameter may specify that a message should only be delivered when a speed of a device of the recipient is at or below a threshold speed. However, the recipient may have multiple devices which are all capable of receiving messages intended for the recipient. For example, the recipient may receive SMS messages and emails at a home personal computer, a work computer, a smart phone, and/or other mobile devices. The sender may therefore not know which device(s) the recipient is currently using. Thus, for example, a sender may specify in the speed parameter that the message not be sent to the recipient if a device associated with the recipient is moving at a speed greater than the speed threshold (e.g., five feet per second). However, if the recipient is at work and is present on his/her work desktop computer, the speed of the device associated with the recipient (the desktop computer) is unlikely to be moving at a speed over the threshold. On the other hand, the method 300 may determine that a user is not logged in on a home computer and is not logged in on a work computer, but has a cellular telephone that is registered and active. Thus, the user is "present" on the cellular telephone/cellular network. As such, at step 330 the method may obtain speed information for the cellular telephone in order to determine whether the speed parameter is satisfied. The speed information can be observed by, for instance, by an accelerometer on a phone, a peripheral device attached to the phone through wired or wireless connection (e.g., Bluetooth), or derived from GPS location information, cell base station data or wireless access point data to detect change in position, etc. If not, the method returns to step 320 where the message continues to be stored and returns to step 330 again to determine whether the speed information has changed such that the speed parameter is satisfied. On the other hand, if the speed parameter is satisfied, the method continues to step 340.

At step 340, the method 300 delivers the message to the device associated with the recipient. For example, if method 300 determines that the recipient is present on a particular device capable of receiving the message and that the speed of the device satisfies the speed threshold, the message is forwarded to the device.

Following step 340, the method proceeds to step 395 where the method terminates.

As mentioned above, in some embodiments the message may have specified one or more additional presence parameters in addition to a speed parameter. For instance, a sender may also specify a mood parameter such that the message is not sent unless the user is in a positive mood. As such, at step 330 the method 300 may also evaluate any additional presence parameters that are included in the message. For example, the method 300 may determine that a device associated with a recipient and on which the recipient is present satisfies the speed parameter. However, the method 300 may also determine that the recipient's mood does not satisfy the mood parameter (e.g., the recipient is in a negative mood, or is not in a positive mood). As such, the method 300 may determine that the message should not presently be delivered. Accordingly, the method may proceed from step 330 back to step 320 where the method continues to store the message, before again proceeding to step 330 to determine whether the presence information has changed such that the presence parameters are satisfied (e.g., the device remains below the speed threshold and the mood of the recipient meets the mood parameter as specified in the message).

In general, the combination of different presence parameters and the number of such presence parameters are selected by the sender and thus, numerous different examples of presence based messaging are possible. As one further example, a sender may specify a speed parameter for a message (as described above) and may further specify an additional time parameter. For instance, the sender would like to deliver a message to a recipient but only before 4:00 p.m. on the same day and while the recipient is not potentially driving a car. As such, the sender may additionally specify a time parameter such that delivery attempts for the message will cease if not delivered at or before 4:00 p.m. In still another embodiment, one or more additional parameters may pertain to presence information of the sender (e.g., a location of the sender device, a speed of the sender device, a mood of the sender, etc.).

Figure 4:
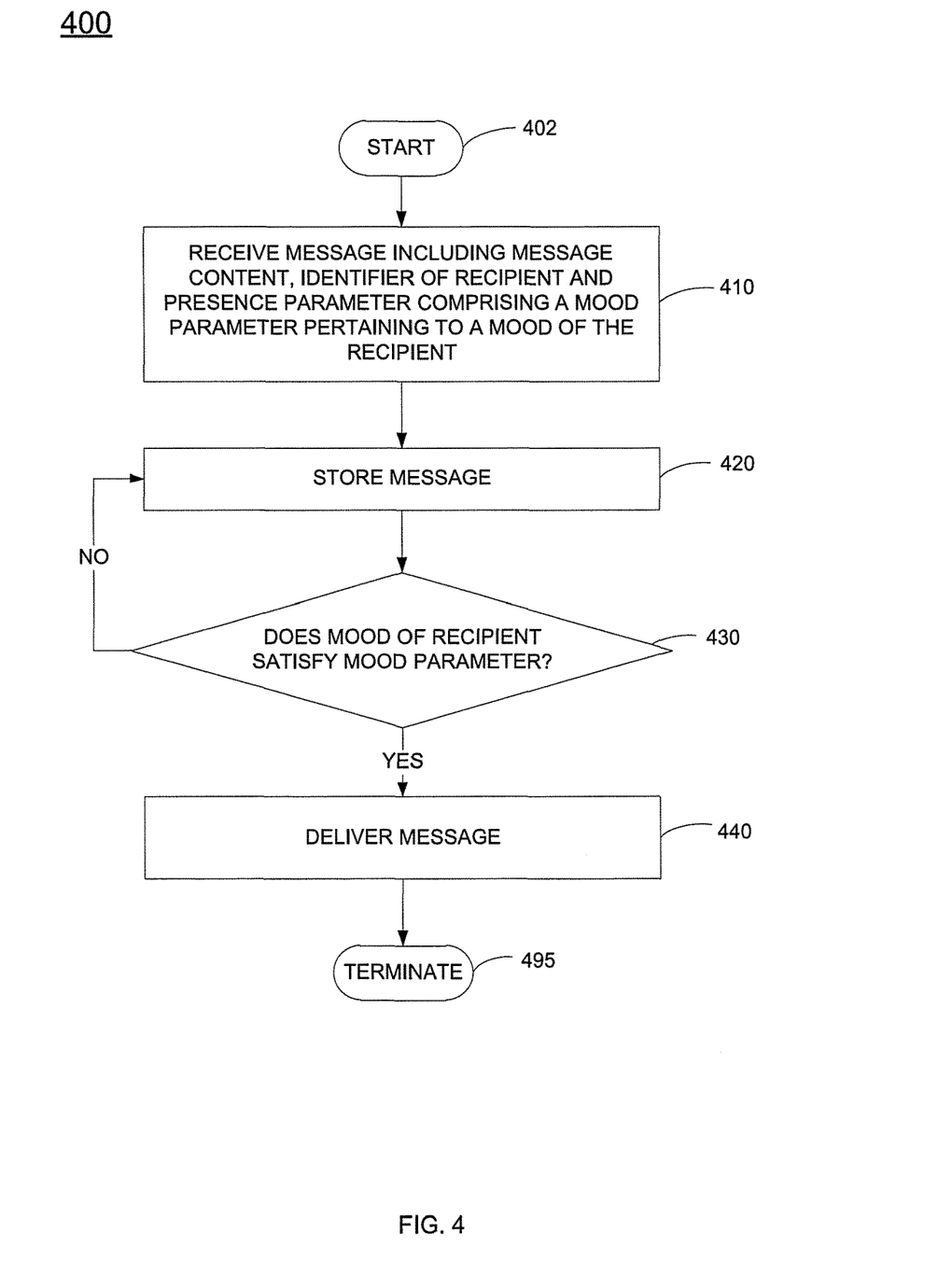
FIG. 4 illustrates a flowchart of another method for providing presence based messaging according to the present disclosure.

FIG. 4 illustrates a flowchart a method 400 comprising another embodiment for providing presence based messaging. In various embodiments, the steps (or operations) of the method 400 may be performed by any one or more of the components of the network 100 depicted in FIG. 1 or network 200 depicted in FIG. 2, for example application server 112 and/or SMSC 265. Similarly, it should also be understood that one or more steps of the method 400 may be implemented by a general purpose computer having a processor, a memory and input/output devices as illustrated below in FIG. 5.

The method 400 begins in step 402 and proceeds to step 410. At step 410, the method 400 receives a message (e.g., from a sender device). In one embodiment, the message includes message content, an identifier of one or more recipients and at least one presence parameter comprising at least a mood parameter. The message content and the recipient identifiers make take the form of any one or more of the message content types and recipient identifiers described above in connection with the embodiment of FIG. 3. The mood parameter relates to a mood of a recipient (e.g., positive moods, negative moods, or neutral moods as discussed above). The mood parameter may be selected by the sender to define moods of the recipient for which the message should or should not be delivered. For example, the sender may be asking the recipient for help with a chore but does not want to ask for help while the recipient is in a negative mood.

In some embodiments, one or more additional presence parameters may be included in the message in addition to a mood parameter. For example, a sender may specify a speed parameter such that a speed of a device associated with the recipient also needs to be below a particular value in order to deliver the message. For example, the sender may be asking the recipient for help with a chore but does not want to ask for help while the recipient is in a negative mood and does not want to distract the recipient while he/she may be driving. Thus, in this example, the message may have at least two presence parameters specified (one for mood and one for speed). In still another embodiment, one or more additional parameters may pertain to presence information of the sender (e.g., a location of the sender device, a speed of the sender device, a mood of the sender, etc.). It should be appreciated that various other combinations of presence parameters as discussed above are possible in the same nature as the examples given here.

At step 420, the method 400 stores the received message. For example, at the following step 430 the method 400 will need to make a determination as to whether the presence parameters are satisfied prior to delivering the message to the intended recipient(s). Thus, in the meantime, at step 420, the method 400 stores the message.

At step 430, the method 400 determines whether a mood of the recipient satisfies the mood parameter. For example, mood information of a recipient can be collected from various points of data, such as by deriving from calling/messaging patterns, biometric sensors (e.g., acoustic sensors, temperature sensors), image processing of images captured by a camera or a video recorder, explicit mood entries in a social networking profile or instant messaging profile), and so on. Regardless of the manner in which the recipient's mood information is collected, it is compared to the mood parameter to determine whether the mood parameter is satisfied. For instance, if the recipient is "sad" (a negative mood), the mood parameter may remain unsatisfied. As such, the method may return to step 420 where the message continues to be stored before again proceeding to step 430 to determine whether the mood information has changed such that the mood parameter is satisfied. On the other hand, if the recipient is "happy" (a positive mood), the mood parameter of the message may be satisfied. If so, the method proceeds to step 440.

At step 440, the method 400 delivers the message to the device associated with the recipient. For example, if method 400 determines that the recipient is presently on a particular device and the recipient's mood satisfies the mood parameter, the message is forwarded to the device.

Following step 440, the method 400 proceeds to step 495 where the method terminates.

As mentioned above, in some embodiments the message may have specified one or more additional presence parameters in addition to a mood parameter. For instance, a sender may also specify a speed parameter such that the message is not sent unless the speed of a device associated with the recipient is below a speed threshold. As such, at step 430 the method 400 may also evaluate any additional presence parameters that are included in the message. For example, it may be determined that the recipient's mood satisfies the mood parameter. However, the method 400 may also determine that the speed of a device associated with a recipient does not satisfy the speed parameter. For example, the recipient may presently be driving a car. As such, the method 400 may determine that the message should not presently be delivered. Accordingly, the method may proceed from step 430 back to step 420 where the method continues to store the message, before again proceeding to step 430 to determine whether the speed information has changed such that all of the presence parameters are satisfied (e.g., the mood of the recipient remains compliant with the mood parameter and the speed of the device has fallen below the speed threshold).

In general, the combination of different presence parameters and the number of such presence parameters are selected by the sender and thus, numerous different examples of presence based messaging are possible. As one further example, a sender may specify a mood parameter for a message (as described above) and may further specify a time parameter. For instance, the sender would like to deliver a message to a recipient but only before 4:00 p.m. on the same day and while the recipient is in a positive mood. As such, the sender may additionally specify a time parameter such that delivery attempts for the message will cease if not delivered at or before 4:00 p.m. As still another example, a husband may want to send a message to his wife asking her to pick up a dessert on her way home from work, but only want to send the message if the wife's route home from work happens to take her past the bakery and the wife is not in a negative mood. As such, the message may have two presence parameters: a mood parameter which indicates the message should only be sent if the wife is not in a negative mood and a location parameter, such as geofence of 1000 meters around the location of the bakery. Thus, if the wife takes a different route home, or if she is in a negative mood, the message will not be delivered. In still another embodiment, one or more additional parameters may pertain to presence information of the sender (e.g., a location of the sender device, a speed of the sender device, a mood of the sender, etc.).

It should be noted that although not specifically specified, one or more steps of each of the respective methods 300 and 400 may include a storing, displaying and/or outputting step as required for a particular application. In other words, any data, records, fields, and/or intermediate results discussed in each of the respective methods can be stored, displayed and/or outputted to another device as required for a particular application. Furthermore, steps, blocks, or operations in each of FIGS. 3-4 that recite a determining operation or involve a decision do not necessarily require that both branches of the determining operation be practiced. In other words, one of the branches of the determining operation can be deemed as an optional step.

Figure 5:
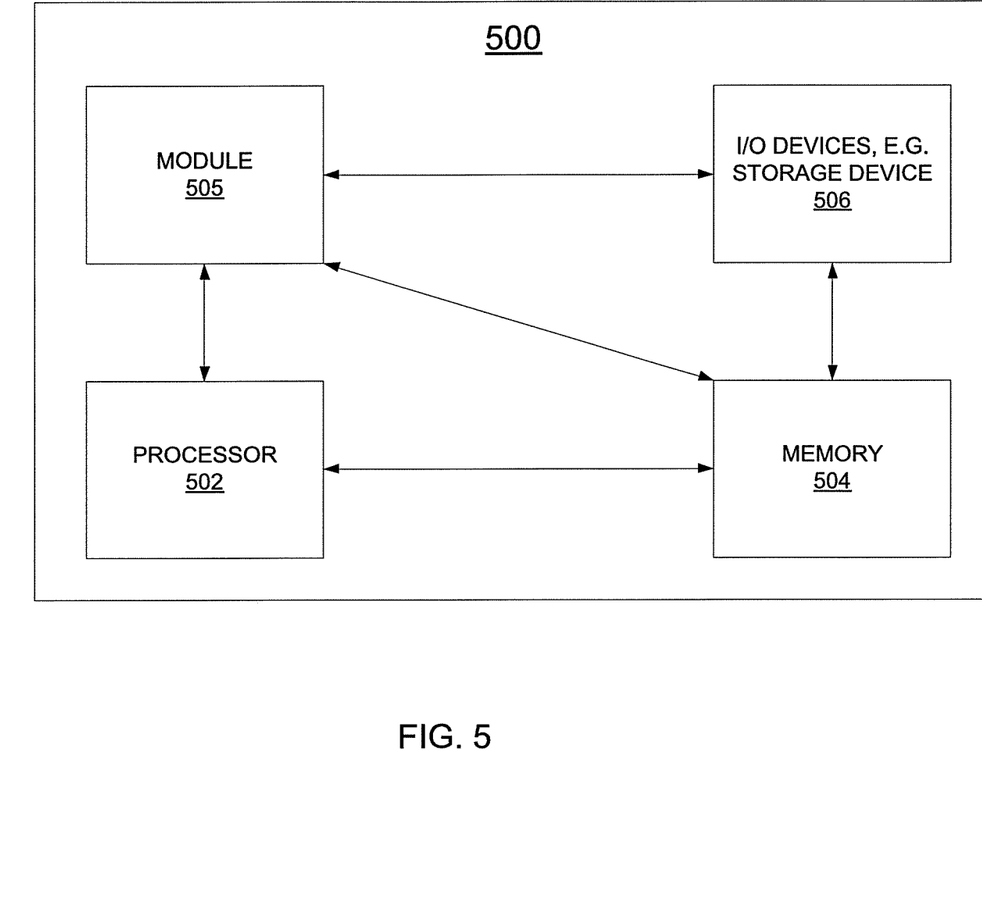
FIG. 5 illustrates a high-level block diagram of a general-purpose computer suitable for use in performing the functions described herein.

FIG. 5 depicts a high-level block diagram of a general-purpose computer suitable for use in performing the functions described herein. As depicted in FIG. 5, the system 500 comprises a hardware processor element 502 (e.g., a CPU), a memory 504, e.g., random access memory (RAM) and/or read only memory (ROM), a module 505 for performing various functions as described herein, and various input/output devices 506 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)). In one embodiment, module 505 may comprise computer/processor executable code containing a plurality of instructions for performing steps of the exemplary methods 300 and/or 400.

Accordingly, it should be noted that the present disclosure can be implemented in software and/or in a combination of software and hardware, e.g., using application specific integrated circuits (ASIC), a general purpose computer or any other hardware equivalents, e.g., computer readable instructions pertaining to the method(s) discussed above can be used to configure a hardware processor to perform the steps of the above disclosed methods. For example, in one embodiment, the module or process 505 can be loaded into memory 504 and executed by processor 502 to implement the functions as discussed above in connection with any one or more of the exemplary methods 300 and 400. As such, the present module or process 505 (including associated data structures) of the present disclosure can be stored on a non-transitory (tangible or physical) computer readable medium, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for delivering a message, the method comprising:

receiving, by a processor, the message, the message including a message content, an identifier of a recipient and a plurality of presence parameters, the plurality of presence parameters comprising a speed parameter pertaining to a speed of a device associated with the recipient, a relationship parameter pertaining to a relationship status between a sender of the message and the recipient, and a time parameter, wherein the time parameter specifies a time period after a specified event, wherein the specified event comprises the speed of the device associated with the recipient remaining below a threshold speed for a specified duration of time, wherein the message comprises an electronic message;
storing, by the processor, the message;
determining, by the processor, the speed of the device associated with the recipient, wherein the speed of the device associated with the recipient is determined via a detection of a change in a position of the device associated with the recipient; and
delivering, by the processor, the message to the device associated with the recipient when the speed of the device associated with the recipient is determined to satisfy the speed parameter, when the relationship parameter is determined to be satisfied, and when the time parameter is determined to be satisfied.

2. The method of claim 1, wherein the plurality of presence parameters further includes an additional presence parameter related to the sender of the message.

3. The method of claim 1, wherein the plurality of presence parameters further includes an additional presence parameter comprising one of:
   a location parameter;
   a proximity parameter;
   an accept group of messages parameter;
   an availability parameter; or
   a mood parameter.

4. The method of claim 3, wherein the delivering the message comprises delivering the message when the speed of the device associated with the recipient is determined to satisfy the speed parameter, when the relationship parameter is determined to be satisfied, when the time parameter is determined to be satisfied, and when the additional presence parameter is determined to be satisfied.

5. The method of claim 3, further comprising:
   discarding the message when the speed parameter, the relationship parameter, or the time parameter is determined not to be satisfied, or when the additional presence parameter is determined not to be satisfied.

6. The method of claim 1, wherein the speed of the device associated with the recipient is determined from one of:
   global positioning satellite data;
   base station connection data;
   wireless access point connection data; or
   peripheral data from a peripheral in communication with the device associated with the recipient.

7. A method for delivering a message, the method comprising:
   receiving, by a processor, the message, the message including a message content, an identifier of a recipient and a plurality of presence parameters, the plurality of presence parameters comprising a mood parameter pertaining to a mood of the recipient, a speed parameter pertaining to a speed of a device associated with the recipient, a relationship parameter pertaining to a relationship status between a sender of the message and the recipient, and a time parameter, wherein the time parameter specifies a time period after a specified event, wherein the specified event comprises the speed of the device associated with the recipient remaining below a threshold speed for a specified duration of time, wherein the message comprises an electronic message;
   storing, by the processor, the message;
   determining, by the processor, the speed of the device associated with the recipient, wherein the speed of the device associated with the recipient is determined via a detection of a change in a position of the device associated with the recipient; and
   delivering, by the processor, the message to the device associated with the recipient when the mood of the recipient is determined to satisfy the mood parameter, when the speed of the device associated with the recipient is determined to satisfy the speed parameter, when the relationship parameter is determined to be satisfied, and when the time parameter is determined to be satisfied.

8. The method of claim 7, wherein the plurality of presence parameters further includes an additional presence parameter related to the sender of the message.

9. The method of claim 7, wherein the plurality of presence parameters further includes an additional presence parameter comprising one of:
   a location parameter;
   a proximity parameter;
   an accept group of messages parameter; or
   an availability parameter.

10. The method of claim 9, wherein the delivering the message comprises delivering the message when the mood parameter is determined to be satisfied, when the speed parameter is determined to be satisfied, when the relationship parameter is determined to be satisfied, when the time parameter is determined to be satisfied, and when the additional presence parameter is determined to be satisfied.

11. The method of claim 10, wherein the additional presence parameter comprises the location parameter, the method further comprising:
   discarding the message when the mood of the recipient is determined as failing to satisfy the mood parameter or when the device associated with the recipient is determined as not being within a geofence defined by the location parameter.

12. The method of claim 10, further comprising:
   discarding the message when the mood of the recipient is determined as failing to satisfy the mood parameter or when the speed of the device associated with the recipient is determined as not being below a threshold specified in the speed parameter.

13. The method of claim 7, wherein the mood parameter comprises one or more types of moods, wherein the mood parameter is determined to be satisfied when the mood of the recipient comprises one of the one or more types of moods.

14. The method of claim 13, wherein the one or more types of moods comprise a positive mood, a negative more, or a neutral mood.

15. The method of claim 7, wherein the mood of the recipient is determined from one of:
   a user entry made by the recipient on the device associated with the recipient;
   a user entry made by the recipient on a social networking host;
   an image of the recipient; or
   a biometric sensor.

16. A non-transitory computer-readable medium storing instructions which, when executed by a processor, cause the processor to perform operations for delivering a message, the operations comprising:
   receiving the message, the message including a message content, an identifier of a recipient and a plurality of presence parameters, the plurality of presence parameters comprising a mood parameter pertaining to a mood of the recipient, a speed parameter pertaining to a speed of a device associated with the recipient, a relationship parameter pertaining to a relationship status between a sender of the message and the recipient, and a time parameter, wherein the time parameter specifies a time period after a specified event, wherein the specified event comprises the speed of the device associated with the recipient remaining below a threshold speed for a specified duration of time, wherein the message comprises an electronic message;

storing the message;

determining the speed of the device associated with the recipient, wherein the speed of the device associated with the recipient is determined via a detection of a change in a position of the device associated with the recipient; and delivering the message to the device associated with the recipient when the mood of the recipient is determined to satisfy the mood parameter, when the speed of the device associated with the recipient is determined to satisfy the speed parameter, when the relationship parameter is determined to be satisfied, and when the time parameter is determined to be satisfied.

17. The non-transitory computer-readable medium of claim 16, wherein the plurality of presence parameters further includes an additional presence parameter related to the sender of the message.

18. The non-transitory computer-readable medium of claim 16, wherein the plurality of presence parameters further includes an additional presence parameter comprising one of:
- a location parameter;
- a proximity parameter;
- an accept group of messages parameter; or
- an availability parameter.

19. The non-transitory computer-readable medium of claim 18, wherein the delivering the message comprises delivering the message when the mood parameter is determined to be satisfied, when the speed parameter is determined to be satisfied, when the device identifier relationship parameter is determined to be satisfied, when the time parameter is determined to be satisfied, and when the additional presence parameter is determined to be satisfied.

20. The non-transitory computer-readable medium of claim 19, wherein the additional presence parameter comprises the location parameter, the operations further comprising:

discarding the message when the mood of the recipient is determined as failing to satisfy the mood parameter or when the device associated with the recipient is determined as not being within a geofence defined by the location parameter.

* * * * *